United States Patent
Tanimoto

(10) Patent No.: US 9,909,622 B2
(45) Date of Patent: Mar. 6, 2018

(54) ROLLING BEARING DEVICE

(71) Applicant: JTEKT CORPORATION, Osaka-shi, Osaka (JP)

(72) Inventor: Kiyoshi Tanimoto, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/399,929

(22) Filed: Jan. 6, 2017

(65) Prior Publication Data

US 2017/0198753 A1     Jul. 13, 2017

(30) Foreign Application Priority Data

Jan. 12, 2016    (JP) ................................ 2016-003473

(51) Int. Cl.
| | |
|---|---|
| *F16C 33/66* | (2006.01) |
| *F16C 19/16* | (2006.01) |
| *F16C 33/38* | (2006.01) |

(52) U.S. Cl.
CPC ........ *F16C 33/6659* (2013.01); *F16C 19/163* (2013.01); *F16C 33/3806* (2013.01); *F16C 33/3837* (2013.01); *F16C 2322/39* (2013.01)

(58) Field of Classification Search
CPC .. F16C 19/163; F16C 33/3843; F16C 33/385; F16C 33/3856; F16C 33/6659; F16C 33/6666; F16C 33/6681
See application file for complete search history.

(56) References Cited

U.S. PATENT DOCUMENTS

| | | | | | |
|---|---|---|---|---|---|
| 4,286,829 | A | * | 9/1981 | Heemskerk | ........... F16C 19/163 384/469 |
| 4,342,489 | A | * | 8/1982 | Lenz | ................... F16C 33/6659 184/6.11 |
| 7,883,271 | B2 | * | 2/2011 | Suzuki | ................ F16C 33/3856 384/462 |
| 7,909,513 | B2 | * | 3/2011 | Ueno | .................... F16C 19/163 384/470 |
| 8,534,920 | B2 | * | 9/2013 | Aida | ................... F16C 33/3875 384/470 |
| 9,228,611 | B2 | * | 1/2016 | Yamamoto | ............ F16C 33/664 |

(Continued)

FOREIGN PATENT DOCUMENTS

| | | | |
|---|---|---|---|
| JP | 2004-108388 A | 4/2004 | |
| JP | 2007309472 A * | 11/2007 | ............ F16C 33/664 |

(Continued)

*Primary Examiner* — Phillip A Johnson
(74) *Attorney, Agent, or Firm* — Oliff PLC

(57) ABSTRACT

A rolling bearing device includes: a bearing part having an inner ring, an outer ring, and balls; and an oil supply unit provided adjacent to an annular space between the inner ring and the outer ring and capable of supplying lubricating oil to the annular space. The bearing part has an annular cage provided in the annular space. The cage has a pair of annular parts and a plurality of bars. An outer circumferential surface of the annular part located on a first axial side has a contact portion capable of coming in contact with a part of an inner circumferential surface of the outer ring. A radially outer surface of the cage has, with the contact portion being a top, a first inclined surface provided from the top toward the first axial side and a second inclined surface provided from the top toward a second axial side.

6 Claims, 4 Drawing Sheets

(56) References Cited

U.S. PATENT DOCUMENTS

| | | | | |
|---|---|---|---|---|
| 9,377,053 B2* | 6/2016 | Ito | ............... | F16C 33/664 |
| 2002/0097939 A1* | 7/2002 | Matsuyama | ........ | F16C 33/3856 |
| | | | | 384/572 |
| 2005/0063627 A1* | 3/2005 | Ueda | ................. | F16C 19/163 |
| | | | | 384/523 |
| 2016/0025138 A1* | 1/2016 | Watanabe | ........... | F16C 33/6655 |
| | | | | 384/448 |

FOREIGN PATENT DOCUMENTS

| | | | | |
|---|---|---|---|---|
| JP | 2014037879 A | * | 2/2014 | ............ F16C 33/664 |
| WO | WO-2006088054 A1 | * | 8/2006 | ............ F16C 19/163 |

* cited by examiner

ROLLING BEARING DEVICE

INCORPORATION BY REFERENCE

The disclosure of Japanese Patent Application No. 2016-003473 filed on Jan. 12, 2016 including the specification, drawings and abstract is incorporated herein by reference in its entirety.

BACKGROUND

1. Technical Field

The present disclosure relates to a rolling bearing device including an oil supply unit that supplies minute amounts of lubricating oil to the bearing part.

2. Description of Related Art

Rolling bearings are used, for example, as main shaft bearings of machine tools, and some bearings employ oil-air lubrication to secure the lubricity. In the case of oil-air lubrication, however, air consumption pushes up the running cost. The required ancillary equipment, including an oil-air supply device and an air cleaning unit, may also push up the equipment cost.

A bearing device is known that has a built-in oil supply unit as alternative means for supplying oil to the rolling bearing (e.g., see Japanese Patent Application Publication No. 2004-108388). In this bearing device, the oil supply unit is mounted on the outer ring, and the rolling bearing and the oil supply unit are integrated. The oil supply unit includes a pump that discharges lubricating oil to an annular space formed between the inner ring and the outer ring.

The lubricating oil is discharged from the pump in minute amounts, and the amount of lubricating oil to be discharged is adjusted by controlling the action of the pump. The lubricating oil is discharged by the pump intermittently (at time intervals) as oil droplets, with the amount of lubricating oil discharged from the pump by one action being, for example, about several picoliters to several hundred nanoliters. According to this bearing device that includes the oil supply unit along with the rolling bearing, minute amounts of lubricating oil can be discharged to the annular space between the inner ring and the outer ring, and the rolling bearing is lubricated as the discharged lubricating oil adheres to the raceway surfaces of the inner ring and the outer ring, the rolling elements, and the cage retaining the rolling elements.

SUMMARY

In a rolling bearing, supplying a large amount of lubricating oil for lubrication results in degradation of the rotation characteristics due to an increased oil agitation resistance. Especially in the case of a rolling bearing rotating at a high speed, such as the main shaft bearing of a machine tool, the rotation characteristics degrade as the amount of lubricating oil increases.

Here, the bearing device including the oil supply unit as described above can lubricate the components of the rolling bearing with a small amount of lubricating oil. However, if the lubricating oil supplied is not applied to a region in need of lubrication, seizure etc. occurs in that region, causing damage to the bearing. For example, in the case where the cage is guided by the outer ring as a part of the outer circumferential surface of the cage comes in sliding contact with a part of the inner circumferential surface of the outer ring, it is necessary to supply lubricating oil to the sliding contact portions of the cage and the outer ring. However, any lubricating oil adhering to and remaining in regions other than that part of the cage (regions not in need of lubrication) is wasted without being used for lubricating the sliding contact portions.

Therefore, the present disclosure provides a rolling bearing device that can efficiently use lubricating oil supplied from an oil supply unit even when the amount of this lubricating oil is small.

A rolling bearing device of a first embodiment of the present disclosure includes: a bearing part having an inner ring, an outer ring, a plurality of rolling elements interposed between the inner ring and the outer ring, and an annular cage provided in an annular space formed between the inner ring and the outer ring to retain the plurality of rolling elements; and an oil supply unit provided axially adjacent to the annular space and capable of supplying lubricating oil to the annular space. The cage has a pair of annular parts. One of the annular parts is provided on a first axial side of the rolling elements and the other one of the annular parts is provided on a second axial side of the rolling elements. The cage also has a plurality of bars that are provided at intervals in a circumferential direction and connect the pair of annular parts to each other. Clearances between the bars adjacent to one another in the circumferential direction constitute pockets in which the rolling elements are retained. An outer circumferential surface of the annular part located on the first axial side has a contact portion capable of coming in contact with a part of an inner circumferential surface of the outer ring. A radially outer surface of the cage has, with the contact portion being a top at which the radial dimension of the cage is largest, a first inclined surface provided from the top toward the first axial side and a second inclined surface provided from the top toward the second axial side.

According to this rolling bearing device, the radially outer surface of the cage has, with the contact portion capable of coming in contact with a part of the inner circumferential surface of the outer ring being the top, the first inclined surface and the second inclined surface provided on both axial sides of the top. Thus, under the centrifugal force caused by the rotating bearing part, lubricating oil adhering to the radially outer surface of the cage flows along the first inclined surface and the second inclined surface and is guided to the contact portion. As a result, the lubricating oil can be gathered at the gap between the contact portion of the cage and the part of the inner circumferential surface of the outer ring. Thus, even when the amount of lubricating oil supplied from the oil supply unit is small, this lubricating oil can be efficiently used to prevent seizure etc. due to sliding between the cage and the outer ring.

The first inclined surface may be a surface of which the outer diameter increases gradually from an end of the cage on the first axial side toward the contact portion, and the second inclined surface may be a surface of which the outer diameter increases gradually from an end of the cage on the second axial side toward the contact portion and of which the inclination angle is smaller than that of the first inclined surface. In this case, an outer circumferential surface of the annular part located on the second axial side and radially outer surfaces of the bars continuous with this annular part are included in the second inclined surface. Thus, a configuration is obtained in which the lubricating oil is guided to the contact portion under the centrifugal force caused by the rotating bearing part.

In the rolling bearing device, the bearing part may have a configuration of an angular contact ball bearing in which balls constituting the rolling elements come in contact with the inner ring and the outer ring at a contact angle. The outer ring may have a raceway surface which has a circular concave shape in cross-section and on which the balls roll, and a pair of shoulders that face the radially outer surface of the cage across a clearance. One of the shoulders is provided on the first axial side of the raceway surface and the other one of the shoulders is provided on the second axial side of the raceway surface. In this case, the clearance between the second inclined surface and the shoulder of the outer ring on the second axial side become smaller. This allows the lubricating oil adhering to the shoulder of the outer ring to be entrained and moved to the contact portion by the lubricating oil flowing along the second inclined surface.

The rolling bearing device may further include a clearance filler that reduces the axial dimension of an annular clearance formed between the oil supply unit and the annular part located axially adjacent to the oil supply unit. When the bearing part rotates, the cage also rotates along with the rolling elements, causing surrounding air to be entrained and rotate in the circumferential direction. Accordingly, if the annular clearance formed between the oil supply unit and the annular part located adjacent thereto is narrowed by the clearance filler as described above, the lubricating oil present in this annular clearance can be involved in the rotating air. Thus, the lubricating oil present in the annular clearance is given a chance to be supplied to the gap between the outer ring and the contact portion of the cage, which can further improve the efficiency of use of the lubricating oil.

The clearance filler of the rolling bearing device may be an annular spacer provided on the oil supply unit side, and the spacer may have a first part located on a radially outer side, and a second part provided on a radially inner side of the first part and having an inclined guide surface that extends toward the radially outer side so as to gradually approach the cage. In this case, the flow velocity of the rotating air can be increased on the radially outer side in the annular clearance, so that the lubricating oil present on the radially inner side in the annular clearance can be carried toward the radially outer side. Thus, this lubrication oil becomes available for lubricating the gap between the outer ring and the contact portion of the cage.

A rolling bearing device of a second embodiment of the present disclosure includes: a bearing part having an inner ring, an outer ring, a plurality of rolling elements interposed between the inner ring and the outer ring, and an annular cage provided in an annular space formed between the inner ring and the outer ring to retain the plurality of rolling elements; and an oil supply unit provided axially adjacent to the annular space and capable of supplying lubricating oil to the annular space. The cage has a pair of annular parts. One of the annular parts is provided on a first axial side of the rolling elements and the other one of the annular parts is provided on a second axial side of the rolling elements. The cage also has a plurality of bars that are provided at intervals in a circumferential direction and connect the pair of annular parts to each other. Clearances between the bars adjacent to one another in the circumferential direction constitute pockets in which the rolling elements are retained. An outer circumferential surface of the annular part located axially adjacent to the oil supply unit has a contact portion capable of coming in contact with a part of an inner circumferential surface of the outer ring. The rolling bearing device further includes a clearance filler that reduces the axial dimension of an annular clearance formed between the oil supply unit and the annular part located axially adjacent to the oil supply unit.

According to this rolling bearing device, when the bearing part rotates, the cage also rotates along with the rolling elements, causing surrounding air to be entrained and rotate in the circumferential direction. Accordingly, if the annular clearance formed between the oil supply unit and the annular part located adjacent thereto is narrowed by the clearance filler as described above, the lubricating oil present in this annular clearance can be involved in the rotating air. Thus, the lubricating oil present in the annular clearance is given a chance to be supplied to the gap between the outer ring and the contact portion of the cage. As a result, even when the amount of lubricating oil supplied from the oil supply unit is small, this lubricating oil can be efficiently used to prevent seizure etc. due to sliding between the cage and the outer ring.

According to the present disclosure, even when the amount of lubricating oil supplied from the oil supply unit is small, this lubricating oil can be efficiently used to prevent seizure etc. due to sliding between the cage and the outer ring.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
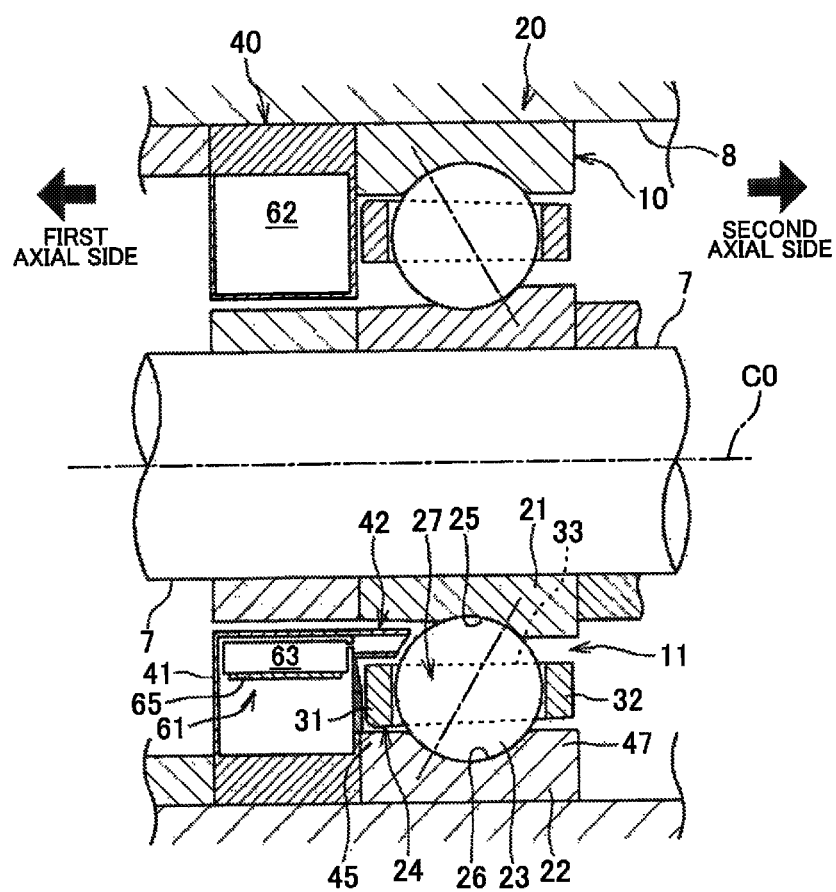
FIG. 1 is a sectional view showing one embodiment of a rolling bearing device.
Figure 2:
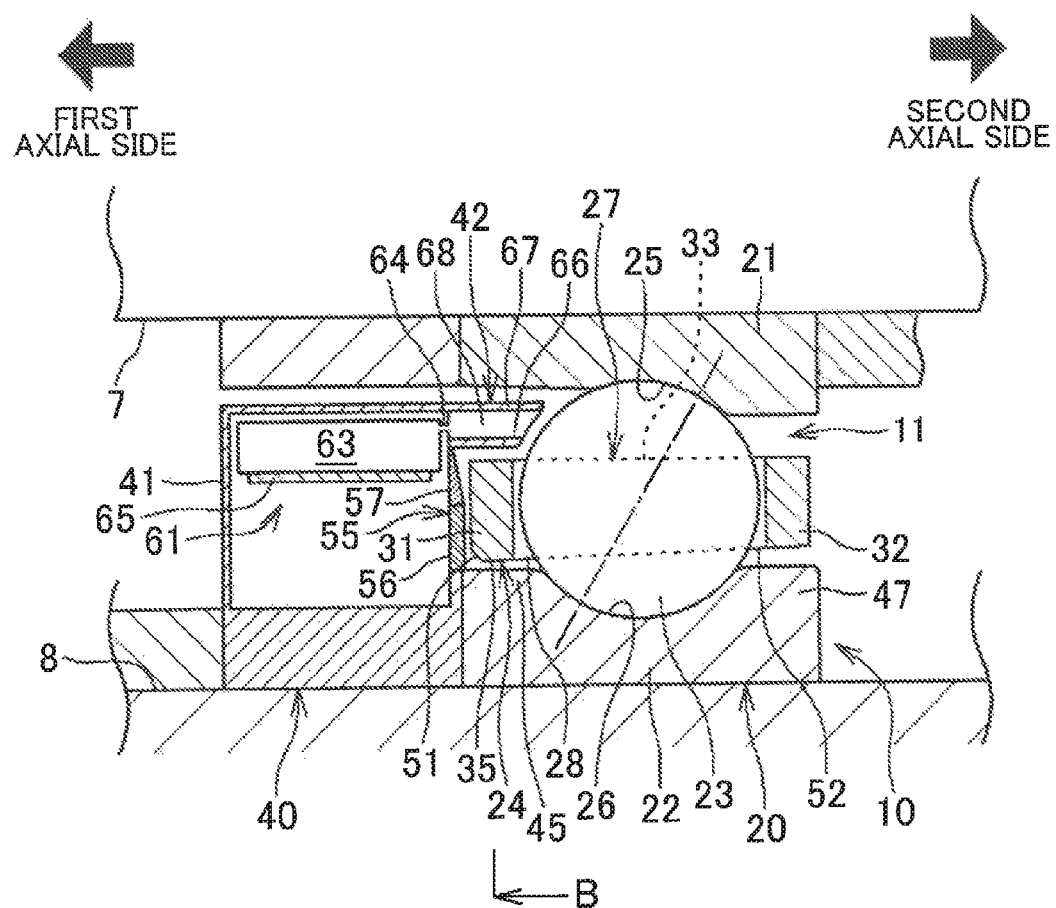
FIG. 2 is a sectional view of a part of the rolling bearing device shown in FIG. 1.

An embodiment of the present disclosure will be described below on the basis of the drawings. FIG. 1 is a sectional view of a rolling bearing device 10. FIG. 2 is a part of the sectional view of the rolling bearing device 10 shown in FIG. 1. The rolling bearing device 10 includes a bearing part 20 and an oil supply unit 40. The rolling bearing device 10 of this embodiment is in a state of being housed inside a bearing housing 8 to rotatably support a main shaft (shaft 7) of a machine tool.

The bearing part 20 has an inner ring 21, an outer ring 22, a plurality of balls (rolling elements) 23, and an annular cage 24 retaining the balls 23. The inner ring 21 is a cylindrical member fitted on the outer side of the shaft 7, and has a raceway groove (hereinafter referred to as an inner ring raceway groove 25) formed as a raceway surface in the outer circumference. The outer ring 22 is a cylindrical member fixed to an inner circumferential surface of the bearing housing 8, and has a raceway groove (hereinafter referred to as an outer ring raceway groove 26) formed as a raceway surface in the inner circumference. In this embodiment, the inner ring 21 rotates along with the shaft 7 relative to the outer ring 22.

The balls 23 are interposed between the inner ring 21 and the outer ring 22, and roll on the inner ring raceway groove 25 and the outer ring raceway groove 26. Thus, the inner ring 21 and the outer ring 22 are disposed concentrically, with an annular space 11 formed between the inner ring 21 and the outer ring 22. In this embodiment, the balls 23 have a contact angle to the raceway grooves 25, 26, and thus the bearing part 20 has a configuration of an angular contact ball bearing.

As the bearing part 20 has a configuration of an angular contact ball bearing, the balls 23 come in contact with the outer ring raceway groove 26 at positions on a first side in the axial direction (hereafter, referred to as "the first axial side"). Accordingly, the outer ring 22 has a shoulder 45 on the first axial side to prevent the balls 23 from rolling out of the outer ring raceway groove 26. In this embodiment, the outer ring 22 further has a similar shoulder 47 on a second side in the axial direction (hereafter, referred to as "the second axial side"). The shoulder 45 on the first axial side and the shoulder 47 on the second axial side have the same diameter (inner diameter).

The cage 24 is provided in the annular space 11. The cage 24 is formed by an annular member, and a plurality of pockets 27 in which the balls 23 are retained are formed in the cage 24 along a circumferential direction. The cage 24 has a pair of annular parts 31, 32 provided one on each axial side of the balls 23, and a plurality of bars 33 connecting the annular parts 31, 32 to each other. The bars 33 are provided at intervals in the circumferential direction. Each region surrounded by the annular parts 31, 32 and the bars 33, 33 adjacent to each other in the circumferential direction constitutes the pocket 27. With one ball 23 housed in each pocket 27, the cage 24 can retain the plurality of balls 23 arrayed in the circumferential direction.

The annular parts 31, 32 are provided between the inner ring 21 and the outer ring 22, axially adjacent to the balls 23 from both sides. An outer circumferential part of the annular part (first annular part) 31 located on the first axial side can come in sliding contact with a part of an inner circumferential surface (shoulder 45) of the outer ring 22, and the cage 24 is radially positioned by the outer ring 22 (outer ring guide). On the other hand, an outer circumferential part of the annular part (second annular part) 32 located on the second axial side does not come in contact with the outer ring 22 (shoulder 47).

The oil supply unit 40 has an annular shape as a whole, and is provided adjacent to the annular space 11 of the bearing part 20 from the first axial side. In FIG. 2, the oil supply unit 40 has an annular main body part 41 and an extension part 42 provided so as to axially extend from the main body part 41.

The main body part 41 is provided axially adjacent to the outer ring 22 that is a fixed ring. In this embodiment, the main body part 41 is separate from the outer ring 22 and functions also as an outer ring spacer, and thus the main body part 41 is made of metal for rigidity. The main body part 41 is an annular member (annular case) having an internal space, and a tank 62 (see FIG. 1) and a pump 61 for lubricating oil (oil) are provided in this space.

In FIG. 2, the pump 61 has a sump 63 that is a region where the lubricating oil is accumulated, and an actuator (piezoelectric element) 65 that pushes out the lubricating oil inside the sump 63 from a discharge port 64. The lubricating oil is supplied from the tank 62 to the sump 63. The action of the pump 61 discharging the lubricating oil is controlled by a control unit (not shown), and the pump 61 discharges the lubricating oil as oil droplets toward the second axial side. Having a predetermined flow velocity, the oil droplets discharged from the discharge port 64 can scatter from the discharge port 64 and hit the balls 23 or the inner ring raceway groove 25. An extremely minute amount of lubricating oil, in the unit of picoliter or nanoliter, is discharged from the pump 61 by each shot. The lubricating oil is thus consumed only in small amounts, so that the rolling bearing device can be used for long hours even when the tank 62 has a limited capacity.

Although not shown, a power source (a power generator, a rechargeable battery, etc.) for the pump 61, various sensors (sensors for detecting temperature, vibration, the state of an oil film, etc.), and the control unit that controls the pump 61 on the basis of outputs from these sensors may also be included in the main body part 41. Alternatively, these components and the tank 62 may be provided outside the rolling bearing device 10.

The extension part 42 axially extends from a portion (a radially inner portion of a side surface) of the main body part 41 to the vicinity of the balls 23, and is interposed between the first annular part 31 of the cage 24 and the inner ring 21. The extension part 42 has a first wall (outer circumferential wall) 66 on the side of the first annular part 31 of the cage 24 and a second wall (inner circumferential wall) 67 on the side of the inner ring 21. A hollow portion 68 is formed between the walls 66, 67. Inside the hollow portion 68, the discharge port 64 of the pump 61 opens toward the balls 23. The oil droplets (lubricating oil) discharged from the discharge port 64 can pass through the hollow portion 68 and head to the inside of the bearing where the balls 23 are present, and can reach the balls 23 and the inner ring raceway groove 25. Then, the lubricating oil adhering to the balls 23 and the inner ring raceway groove 25 can spread to the outer ring raceway groove 26 and the cage 24 to contribute to the lubrication of these components. Thus, the oil supply unit 40 is provided axially adjacent to the annular space 11 of the bearing part 20, and can supply the lubricating oil to the annular space 11.

Figure 3:
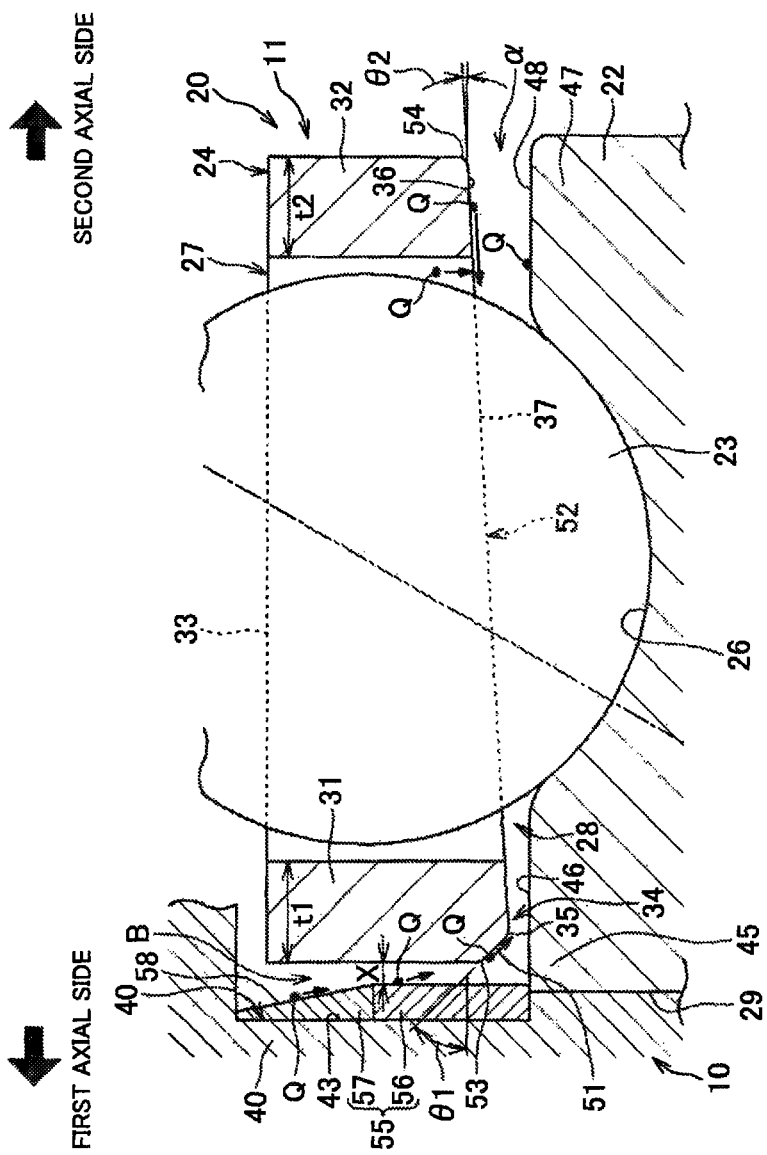
FIG. 3 is a view illustrating a radially outer surface of a cage and the surroundings.

The cage 24 will be further described. FIG. 3 is a view illustrating a radially outer surface 28 of the cage 24 and the surroundings. As described above, the cage 24 is radially positioned by the outer ring 22. For this positioning, an outer circumferential surface 34 of the first annular part 31 of the cage 24 located on the first axial side has a contact portion 35 that can come in contact with a part of the inner circumferential surface of the outer ring 22. When the cage 24 moves radially, the contact portion 35 of the first annular part 31 comes in contact with the outer ring 22, so that the cage 24 is radially positioned. Although the clearance formed between the radially outer surface 28 of the cage 24 and the outer ring 22 is actually set to be extremely small, this clearance is enlarged in FIG. 3 to help understand the description.

That part of the inner circumferential surface of the outer ring 22 with which the contact portion 35 comes in contact is an inner circumferential surface 46 of the shoulder 45 provided on the first axial side of the outer ring raceway groove 26, and the inner circumferential surface 46 serves as a guide surface for the cage 24. When the bearing part 20 rotates, the cage 24 rotates along with the balls 23 relative to the outer ring 22 that is the fixed ring, so that the contact portion 35 and the inner circumferential surface 46 come in sliding contact with each other. Thus, it is necessary to supply the lubricating oil supplied from the oil supply unit 40 not only to the balls 23 and the raceway grooves 25, 26 but also to the part (sliding part) where the contact portion 35 and the inner circumferential surface 46 come in sliding contact with each other.

For this reason, the rolling bearing device 10 has a configuration to gather the lubricating oil supplied from the oil supply unit 40 at the gap between the contact portion 35 of the cage 24 and the inner circumferential surface 46 of the shoulder 45. As a part of this configuration, the radially outer surface 28 of the cage 24 has two inclined surfaces 51, 52. Specifically, the radially outer surface 28 of the cage 24 has the contact portion 35 as a top at which the radial dimension of the cage 24 is largest. The first inclined surface 51 is a tapered surface provided from the top (contact portion 35) toward the first axial side, and the second inclined surface 52 is a tapered surface provided from the top (contact portion 35) toward the second axial side. Thus, in a cross-section including a bearing centerline C0 (see FIG. 1), the radially outer surface 28 of the cage 24 has the shape of a mountain with the contact portion 35 at the top and the first inclined surface 51 and the second inclined surface 52 at the skirts.

In this embodiment, the contact portion 35 is formed as a short cylindrical surface centered on the bearing centerline C0 (see FIG. 1), and the axial dimension of the short cylindrical contact portion 35 is smaller than an axial dimension t1 of the first annular part 31. As has been described above, the radially outer surface 28 of the cage 24 as a whole includes, from the first axial side, the first inclined surface 51, the short cylindrical contact portion 35, and the second inclined surface 52.

Thus, the radially outer surface 28 of the cage 24 has the contact portion 35 that can come in contact with the inner circumferential surface 46 of the shoulder 45 constituting a part of the inner circumferential surface of the outer ring 22, and the radially outer surface 28 further has, with the contact portion 35 being the top, the first inclined surface 51 and second inclined surface 52 provided one on each axial side of the top. When the bearing part 20 rotates, i.e., the inner ring 21 in this embodiment rotates, the balls 23 and the cage 24 also rotate in the same direction. Thus, under the centrifugal force caused by this rotation, lubricating oil Q adhering to the radially outer surface 28 of the cage 24 flows along the first inclined surface 51 and the second inclined surface 52 and is guided to the contact portion 35. Moreover, the lubricating oil Q trying to pass through the pockets 27 toward the radially outer side is likely to join the lubricating oil Q flowing along the second inclined surface 52 and be carried toward the contact portion 35.

In this way, the lubricating oil Q can be gathered at the gap between the contact portion 35 of the cage 24 and the inner circumferential surface 46 of the shoulder 45 of the outer ring 22. Accordingly, even when the amount of lubricating oil Q supplied from the oil supply unit 40 is small, the lubricating oil Q can be efficiently used to prevent seizure due to sliding between the cage 24 and the outer ring 22.

The first inclined surface 51 and the second inclined surface 52 will be further described. The first inclined surface 51 is a surface of which the outer diameter increases gradually from an end 53 of the cage 24 on the first axial side toward the contact portion 35. The second inclined surface 52 is a surface of which the outer diameter increases gradually from an end 54 of the cage 24 on the second axial side toward the contact portion 35. Thus, an outer circumferential surface 36 of the second annular part 32 located on the second axial side and radially outer surfaces 37 of the bars 33 continuous with the second annular part 32 are included in the second inclined surface 52. In addition, a part of the outer circumferential surface 34 of the first annular part 31 on the first axial side is also included in the second inclined surface 52.

An inclination angle θ2 of the second inclined surface 52 is smaller than an inclination angle θ1 of the first inclined surface 51. The inclination angles θ1, θ2 are inclination angles relative to an imaginary cylindrical surface centered on the bearing centerline C0. If the inclination angle θ2 of the second inclined surface 52 is set to a small angle, the radial dimension of the second annular part 32 can be prevented from becoming too small. Moreover, a radial clearance a formed between an inner circumferential surface 48 of the shoulder 47 located on the second axial side of the outer ring 22 and the second annular part 32 can be reduced.

As described above, the outer ring 22 has the raceway surface (outer ring raceway groove 26) which has a circular concave shape in cross-section and on which the balls 23 roll, and the pair of shoulders 45, 47 that are provided one on each axial side of the outer ring raceway groove 26, and the outer ring 22 has a deep groove shape. Accordingly, the outer ring 22 faces the radially outer surface 28 of the cage 24 across a clearance at each of the shoulders 45, 47. At the shoulder 45 located on the first axial side, the first annular part 31 (contact portion 35) can come in contact with the outer ring 22. At the shoulder 47 located on the second axial side, as described above, the second annular part 32 does not come in contact with the outer ring 22 and the clearance a formed therebetween is small. This allows the lubricating oil Q adhering to the inner circumferential surface 48 of the shoulder 47 of the outer ring 22 to be entrained and moved to the contact portion 35 by the lubricating oil Q flowing along the second inclined surface 52.

Thus, as the cage 24 has the first inclined surface 51 and the second inclined surface 52, when the bearing part 20 rotates, the lubricating oil Q can be gathered along the inclined surfaces 51, 52 toward the contact portion 35, and such lubricating oil Q can be used to prevent seizure due to sliding between the cage 24 and the outer ring 22.

Another configuration to gather the lubricating oil at the gap between the contact portion 35 of the cage 24 and the inner circumferential surface 46 of the shoulder 45 of the outer ring 22 will be described. As shown in FIG. 3, an annular clearance B is formed between the oil supply unit 40 and the first annular part 31 located axially adjacent to the oil supply unit 40. The lubricating oil supplied from the oil supply unit 40 may remain in this annular clearance B as well. The lubricating oil in the annular clearance B does not directly contribute to the lubrication of the gap between the outer ring 22 and the cage 24 (contact portion 35).

Therefore, the rolling bearing device 10 further includes a clearance filler 55 that reduces an axial dimension X of the annular clearance B. In the embodiment shown in FIG. 3, the clearance filler 55 is formed by an annular member (annular spacer) mounted on a side surface 43 of the main body part 41 of the oil supply unit 40, and has a first part 56 located on the radially outer side and a second part 57 located on the radially inner side. Although the clearance filler 55 is separate from the oil supply unit 40 (main body part 41) in this embodiment, the clearance filler 55 may instead be integrated with the main body part 41 and formed by a part of the main body part 41. Although the first part 56 and the second part 57 are divided separate parts in FIG. 3, these parts may be an integral part.

At least a part (first part 56) of the clearance filler 55 protrudes further toward the second axial side than a side surface 29 of the outer ring 22 in contact with the oil supply unit 40. Thus, the axial dimension X of the annular clearance B formed between the oil supply unit 40 and the first annular part 31 can be reduced. The clearance filler 55 (first part 56) is provided in contact with the inner circumferential surface 46 of the outer ring 22.

When the bearing part 20 rotates, the cage 24 also rotates along with the balls 23, causing air around the first annular part 31 to be entrained and rotate in the circumferential direction. Accordingly, if the annular clearance B is narrowed by the clearance filler 55 as described above, the lubricating oil Q present in the annular clearance B can be involved in the rotating air. Moreover, the lubricating oil Q adhering to the side surface of the clearance filler 55 can be caused to flow by the flow of air along this side surface and supplied to the inner circumferential surface of the outer ring 22. Thus, according to the clearance filler 55, the lubricating oil Q present in the annular clearance B is given a chance to be supplied to the gap between the outer ring 22 and the contact portion 35 of the cage 24, which allows efficient use of the lubricating oil Q for lubrication.

Even when a wide annular clearance B is left as is without the clearance filler 55 disposed therein, a flow of air in the circumferential direction occurs as the bearing part 20 rotates. However, if the annular clearance B is wide, the flow velocity of the air becomes lower on the side of the side surface 43 of the main body part 41 that is farther away from the cage 24. Accordingly, the lubricating oil adhering to the side surface 43 is less likely to be subjected to this flow of air and involved in the air. By contrast, if the clearance filler 55 is provided as shown in FIG. 3, the flow velocity of the air becomes comparatively high in the annular clearance B, so that the lubricating oil is more likely to be involved in the air.

In the embodiment shown in FIG. 3, the clearance filler 55 that functions as a spacer to reduce the axial dimension X of the annular clearance B has the first part 56 on the radially outer side and the second part 57 on the radially inner side of the first part 56, and the second part 57 has an inclined guide surface 58 that extends toward the radially outer side so as to gradually approach the cage 24 (first annular part 31).

According to this configuration, the flow velocity of the rotating air can be increased on the radially outer side in the annular clearance B, so that the lubricating oil Q on the radially inner side in the annular clearance B can be carried toward the radially outer side. Moreover, the lubricating oil Q adhering to the inclined guide surface 58 can flow along the inclined guide surface 58 toward the radially outer side. Thus, the lubricating oil Q on the radially inner side in the annular clearance B becomes available for lubricating the gap between the outer ring 22 and the contact portion 35 of the cage 24.

Figure 4:
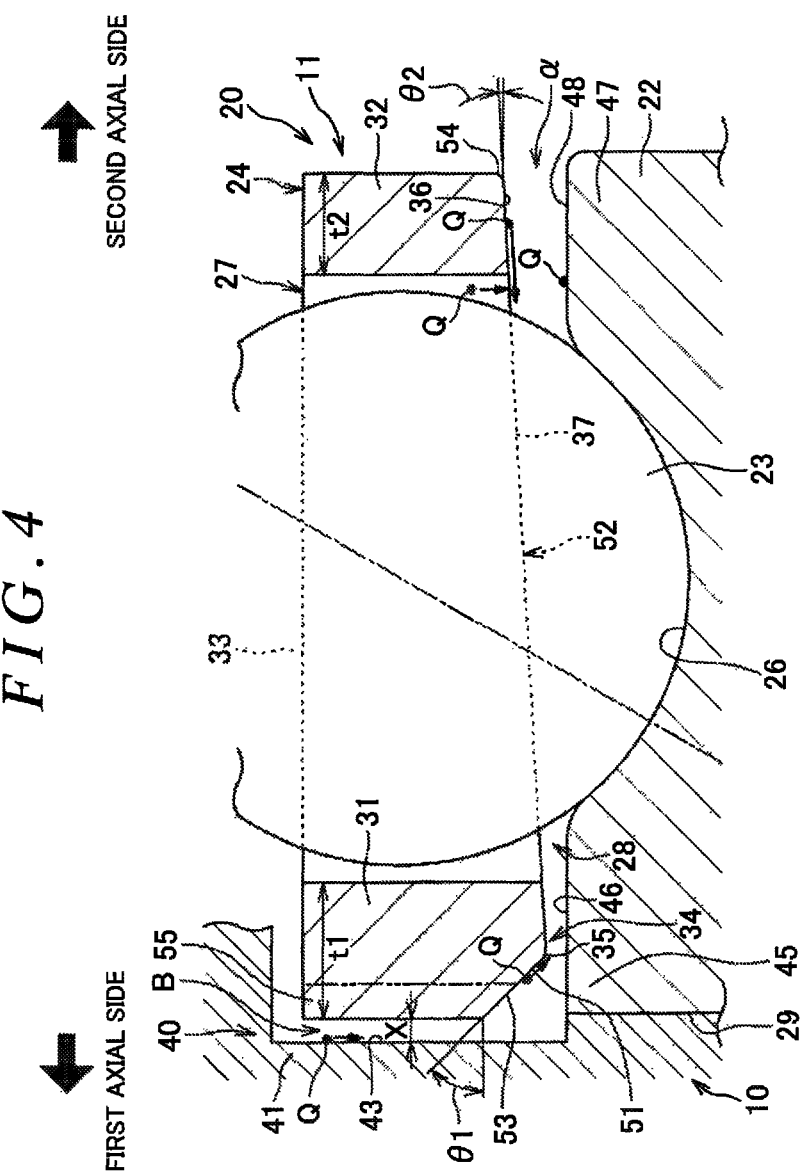
FIG. 4 is a view illustrating a modified example of a clearance filler.

In the embodiment shown in FIG. 3, the case has been described where the clearance filler 55 is formed by an annular spacer provided on the side of the oil supply unit 40. Alternatively, as shown in FIG. 4, the clearance filler 55 to reduce the axial dimension X of the annular clearance B may be formed by axially expanding the first annular part 31 of the cage 24. Specifically, in the case of the cage 24 shown in FIG. 3, the axial dimension t1 of the first annular part 31 and an axial dimension t2 of the second annular part 32 are equal (t1=t2), while in the case of the cage 24 shown in FIG. 4, the axial dimension t1 of the first annular part 31 is larger than the axial dimension t2 of the second annular part 32 (t1>t2). Thus, the first annular part 31 is axially expanded compared with the second annular part 32, and that portion of the difference (t1−t2) is used as the clearance filler 55 to reduce the axial dimension X of the annular clearance B.

In the embodiments shown in FIG. 3 and FIG. 4, the case has been described where the radially outer surface 28 of the cage 24 has the first inclined surface 51 and the second inclined surface 52 other than the contact portion 35, and where the rolling bearing device is further provided with the clearance filler 55. However, an alternative embodiment may be such that the rolling bearing device 10 is provided with the clearance filler 55 as shown in FIG. 3 and FIG. 4 but not provided with the first inclined surface 51 and the second inclined surface 52. The configuration of the rolling bearing device 10 of this alternative embodiment is as follows.

To describe with reference to FIG. 1 and FIG. 3, the rolling bearing device 10 of the alternative embodiment includes the bearing part 20 and the oil supply unit 40. The bearing part 20 has the inner ring 21, the outer ring 22, the plurality of balls 23 interposed between the inner ring 21 and the outer ring 22, and the annular cage 24 retaining the plurality of balls 23. The cage 24 is provided in the annular space 11 formed between the inner ring 21 and the outer ring 22. The oil supply unit 40 is provided axially adjacent to the annular space 11 where the cage 24 is provided, and can supply lubricating oil to the annular space 11. The cage 24 has the pair of annular parts 31, 32 provided one on each axial side of the balls 23 and the plurality of bars 33 connecting the pair of annular parts 31, 32 to each other. The bars 33 are provided at intervals in the circumferential direction, and each clearance between the bars 33, 33 adjacent to each other in the circumferential direction constitutes the pocket 27 in which the ball 23 is retained.

The outer circumferential surface 34 of the (first) annular part 31 located axially adjacent to the oil supply unit 40 has the contact portion 35 that can come in contact with a part of the inner circumferential surface (the inner circumferential surface 46 of the shoulder 45) of the outer ring 22. The rolling bearing device 10 further includes the clearance filler 55, and the clearance filler 55 reduces the axial dimension X of the annular clearance B formed between the oil supply unit 40 and the (first) annular part 31 located axially adjacent to the oil supply unit 40.

According to the above rolling bearing device 10, when the bearing part 20 rotates, the cage 24 also rotates along with the balls 23, causing the air around the first annular part 31 to be entrained and rotate in the circumferential direction. Accordingly, if the annular clearance B is narrowed by the clearance filler 55, the lubricating oil Q present in the annular clearance B can be involved in the rotating air. Thus, the lubricating oil Q present in the annular clearance B is given a chance to be supplied to the gap between the outer ring 22 and the contact portion 35 of the cage 24. As a result, even when the amount of lubricating oil supplied from the oil supply unit 40 is small, the lubricating oil Q can be efficiently used to prevent seizure etc. due to sliding between the cage 24 and the outer ring 22.

For the clearance filler 55, the configurations shown in FIG. 3 and FIG. 4 can also be employed in the rolling bearing device 10 of this alternative embodiment. Thus, even when the first inclined surface 51 and the second inclined surface 52 are omitted, it is possible to efficiently use the lubricating oil Q supplied from the oil supply unit 40 to prevent seizure etc. due to sliding between the cage 24 and the outer ring 22.

To describe with reference to FIG. 2, the first axial side of the annular space 11 of the bearing part 20 is almost entirely closed by the oil supply unit 40 in the rolling bearing devices 10 of the above-described embodiments. On the other hand, the second axial side of the annular space 11 is left open. To radially position the cage 24, the contact portion 35 of the cage 24 can come in sliding contact with a part of the outer ring 22. The region of the outer ring 22 where the contact portion 35 comes in sliding contact is the inner circumferential surface 46 of the shoulder 45 located on the side closer to the oil supply unit 40, i.e., the first axial side. According to this configuration, the lubricating oil gathered at the gap between the contact portion 35 of the cage 24 and the outer ring 22 (shoulder 45) is less likely to flow to the outside of the bearing, and can contribute to lubrication. By contrast, although this is not shown, if the region of the outer ring 22 where the contact portion 35 comes in sliding contact is the shoulder 47 located on the second axial side, any lubricating oil gathered at the gap between the contact portion 35 and the shoulder 47 is then highly likely to flow to the outside of the bearing. In this respect, the embodiment shown in FIG. 2 can maintain (retain) the gathered lubricating oil inside the bearing, and thus can further enhance the lubrication performance.

The rolling bearing device 10 of the present disclosure is not limited to the embodiments shown in the drawings but may be implemented in any other embodiments within the scope of the present disclosure. For example, in the above embodiments, the case has been described where the outer circumferential surface 36 (see FIG. 3) of the second annular part 32 located on the second axial side is also included in the second inclined surface 52, but the outer circumferential surface 36 does not have to be an inclined surface. In the above embodiments, the case has been described where the rolling elements are the balls 23, but the rolling elements may instead be rollers or tapered rollers. In the case where the rolling bearing device 10 constitutes a ball bearing, the ball bearing may also be any other bearing than an angular contact ball bearing.

What is claimed is:

1. A rolling bearing device comprising:
a bearing part having an inner ring, an outer ring, a plurality of rolling elements interposed between the inner ring and the outer ring, and an annular cage provided in an annular space between the inner ring and the outer ring to retain the plurality of rolling elements; and
an oil supply unit provided axially adjacent to the annular space and capable of supplying lubricating oil to the annular space, wherein
the cage has a pair of annular parts, one of the annular parts being provided on a first axial side of the rolling elements and the other one of the annular parts being provided on a second axial side of the rolling elements, and a plurality of bars that are provided at intervals in a circumferential direction and connect the pair of annular parts to each other, clearances between the bars adjacent to one another in the circumferential direction constituting pockets in which the rolling elements are retained,
an outer circumferential surface of the annular part located on the first axial side has a contact portion capable of coming in contact with a part of an inner circumferential surface of the outer ring, and
a radially outer surface of the cage has, with the contact portion being a top at which a radial dimension of the cage is largest, a first inclined surface provided from the top toward the first axial side and a second inclined surface provided from the top toward the second axial side.

2. The rolling bearing device according to claim 1, wherein
the first inclined surface is a surface of which an outer diameter increases gradually from an end of the cage on the first axial side toward the contact portion, and
the second inclined surface is a surface of which an outer diameter increases gradually from an end of the cage on the second axial side toward the contact portion and of which an inclination angle is smaller than that of the first inclined surface.

3. The rolling bearing device according to claim 2, wherein
the bearing part has a configuration of an angular contact ball bearing in which balls constituting the rolling elements come in contact with the inner ring and the outer ring at a contact angle, and
the outer ring has a raceway surface which has a circular concave shape in cross-section and on which the balls roll, and a pair of shoulders that face the radially outer surface of the cage across a clearance, one of the shoulders being provided on the first axial side of the raceway surface and the other one of the shoulders being provided on the second axial side of the raceway surface.

4. The rolling bearing device according to claim 1, further comprising a clearance filler that reduces an axial dimension of an annular clearance provided between the oil supply unit and the annular part located axially adjacent to the oil supply unit.

5. The rolling bearing device according to claim 4, wherein the clearance filler is an annular spacer provided on an oil supply unit side, and the spacer has a first part located on a radially outer side, and a second part provided on a radially inner side of the first part and having an inclined guide surface that extends toward the radially outer side so as to gradually approach the cage.

6. A rolling bearing device comprising:
a bearing part having an inner ring, an outer ring, a plurality of rolling elements interposed between the inner ring and the outer ring, and an annular cage provided in an annular space between the inner ring and the outer ring to retain the plurality of rolling elements;
an oil supply unit provided axially adjacent to the annular space and capable of supplying lubricating oil to the annular space; and
a clearance filler, wherein
the cage has a pair of annular parts, one of the annular parts being provided on a first axial side of the rolling elements and the other one of the annular parts being on a second axial side of the rolling elements, and a plurality of bars that are provided at intervals in a circumferential direction and connect the pair of annular parts to each other, clearances between the bars adjacent to one another in the circumferential direction constituting pockets in which the rolling elements are retained,
an outer circumferential surface of the annular part located axially adjacent to the oil supply unit has a contact portion capable of coming in contact with a part of an inner circumferential surface of the outer ring, and
the clearance filler reduces an axial dimension of an annular clearance provided between the oil supply unit and the annular part located axially adjacent to the oil supply unit.

* * * * *